United States Patent
Lim et al.

(10) Patent No.: US 9,232,449 B2
(45) Date of Patent: Jan. 5, 2016

(54) APPARATUS AND METHOD FOR SETTING NEIGHBOR IN MOBILE COMMUNICATION SYSTEM

(71) Applicant: Samsung Electronics Co., Ltd., Gyeonggi-do (KR)

(72) Inventors: Gyu-Hyun Lim, Gyeonggi-do (KR); Young-Hun Kim, Gyeonggi-do (KR); Jae-Hwan Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/223,176

(22) Filed: Mar. 24, 2014

(65) Prior Publication Data

US 2014/0287755 A1    Sep. 25, 2014

(30) Foreign Application Priority Data

Mar. 22, 2013  (KR) ........................ 10-2013-0031090

(51) Int. Cl.
*H04W 36/00* (2009.01)
*H04W 84/04* (2009.01)

(52) U.S. Cl.
CPC ........ *H04W 36/0083* (2013.01); *H04W 84/045* (2013.01)

(58) Field of Classification Search
CPC ... H04W 56/00; H04W 72/042; H04W 24/02; H04W 36/0072; H04W 76/028; H04W 56/001; H04W 76/027; H04W 76/046; H04W 36/0083; H04W 36/22; H04W 36/04; H04W 36/08; H04W 28/18; H04W 36/00; H04W 72/00
USPC ........................................................ 455/436
See application file for complete search history.

(56) References Cited

U.S. PATENT DOCUMENTS

| | | |
|---|---|---|
| 2008/0227455 A1 | 9/2008 | Kim |
| 2009/0274069 A1 | 11/2009 | Olsson et al. |
| 2010/0027507 A1 | 2/2010 | Li et al. |
| 2012/0176891 A1 | 7/2012 | Chin et al. |

*Primary Examiner* — Kwasi Karikari
(74) *Attorney, Agent, or Firm* — The Farrell Law Firm, P.C.

(57) ABSTRACT

A method and apparatus are provided for setting a neighbor in a Radio Network Controller (RNC) of a mobile communication system. The method includes receiving, from a Node B, a message indicating that a radio link is released; storing source cell information, when restoration of the radio link fails; receiving, from a User Equipment (UE), an RRC cell update message; storing target cell information included in the RRC cell update message; determining whether a neighbor of a source cell and a target cell is set, based on the source cell information and the target cell information; and setting the neighbor by using the source cell information and the target cell information if the neighbor is not set.

15 Claims, 6 Drawing Sheets

APPARATUS AND METHOD FOR SETTING NEIGHBOR IN MOBILE COMMUNICATION SYSTEM

PRIORITY

This application claims priority under 35 U.S.C. §119(a) to Korean Patent Application Serial No. 10-2013-0031090, which was filed in the Korean Intellectual Property Office on Mar. 22, 2013, the entire disclosure of which is hereby incorporated by reference.

BACKGROUND OF THE INVENTION

1. Field of the Invention

The present invention relates generally to an apparatus and method for setting a neighbor in a mobile communication system.

2. Description of the Related Art

Currently, wireless data services such as Code Division Multiple Access (CDMA) 2000, Evolution Data Only (EV-DO), Wideband CDMA (WCDMA), and Wireless Local Area Network (WLAN) have been commercially available; moreover, use of a portable phone and demand for mobile data has been continuously increased at home. According to such a trend, a method has been proposed for providing a mobile communication service by using a subminiature Node B in a building in order to access a mobile communication core network through an indoor broadband network.

For example, in a next-generation network system, a method has been proposed in which a plurality of multi-cells with a small size, for example, femto cells, are arranged in order to satisfy needs for a high data transmission rate and to stably provide various services. A subminiature Node B managing such a femto cell is referred to as an indoor Node B or a femto Node B. By reducing a size of the cell, efficiency of the next-generation network system using a high frequency band will be improved, and use of several cells with the small size is advantageous in view of increasing times of reusing a frequency. Further, a service scheme using the multi-cells with the small size has an advantage in that deterioration of a channel condition due to a reduction of electric waves occurring when one conventional Node B covers all cell area and service impossibility for a user in a shadow area can be solved. Based on such advantages, a combination scheme of a conventional macro cell, i.e., a cell area which an outdoor Node B manages, and femto cells, i.e., a cell area which a subminiature Node B such as an indoor Node B and a femto Node B manages, has appeared.

A Long Term Evolution (LTE) system is a network capable of satisfying needs for a high data rate for an access network, low latency, and packet optimized radio access. The LTE system secures backward compatibility with an access network of a conventional 3GPP/non-3GPP while receiving a high rate rich media. The LTE system is an all-IP based network excluding a conventional circuit-switched communication, which enhances a Quality of Service (QoS) management function and provides a discriminate QoS for a real-time service, e.g., voice communication and video communication, and a non-real-time service, e.g., web browsing and stored and forwarded data transmission, so as to improve efficiency of network resources. Further, the LTE system has introduced a smart antenna technology, i.e. Multiple Input Multiple Output (MIMO), and has expanded a bandwidth for wireless communication.

A setting of a neighbor in a mobile communication system which does not include an automatic optimization technology, such as Self Organizing Networks (SON), is achieved by an operator based on location information of a Node B. In an improved neighbor optimization method, call fault data, handover statistic data, Primary Scrambling Code (PSC) information in each sector, and the like as well as the location information of the Node B, etc., may be used.

In the mobile communication system, coverage of a cell is affected by many factors such as a location of a radio unit, a direction of an antenna, interference with another cell, and the like. Therefore, if a neighbor optimization is performed by reference of only the location information of the Node B, the actual coverage of the cell may not be identical to the neighbor setting. When a User Equipment (UE) moves between two adjacent cells in which the neighbor is not set, it is impossible to perform a handover process while maintaining the continuity of a call. Thus, a call drop occurs or a cutoff of user traffic occurs due to a performance of Radio Resource Control (RRC) Re-establishment (RRE), thereby deteriorating a quality of a corresponding system.

SUMMARY OF THE INVENTION

The present invention is designed to address at least the problems and/or disadvantages described above and to provide at least the advantages described below.

An aspect of the present is to provide an apparatus and method for automatically setting a neighbor for a neighbor setting omission area based on location information obtained during a performance of an RRE operation of User Equipment (UE).

Another aspect of the present invention is to provide an apparatus and method for automatically setting a neighbor between two cells if a neighbor is not set in two adjacent cells of a mobile communication system.

Another aspect of the present invention is to improve a quality of service without an occurrence of a call drop when the UE moves between two cells.

Another aspect of the present invention is to provide a handover function for maintaining a continuous voice call, so as to secure mobility, even though the UE departs from a service area of a current Node B and enters a service area of an adjacent Node B.

Another aspect of the present invention is to optimize an accurate neighbor by accurately recognizing a cell in which the UE is located.

In accordance with another aspect of the present invention, a method of setting a neighbor in a Radio Network Controller (RNC) of a mobile communication system is provided. The method includes: receiving, from a Node B, a message indicating that a radio link is released; storing source cell information, when restoration of the radio link fails; receiving, from a User Equipment (UE), an RRC cell update message; storing target cell information included in the RRC cell update message; determining whether a neighbor of a source cell and a target cell is set, based on the source cell information and the target cell information; and setting the neighbor by using the source cell information and the target cell information if the neighbor is not set.

In accordance with another aspect of the present disclosure, an apparatus for setting a neighbor in a radio network controller (RNC) of a mobile communication system is provided. The apparatus includes: a receiving unit which receives a message indicating that a radio link is released from a Node B and receives an RRC cell update message from UE; and a controller which stores source cell information when restoration of the radio link fails, stores target cell information included in the RRC cell update message, determines whether a neighbor of a source cell and a target cell is set based on the source cell information and the target cell information, and sets the neighbor by using the source cell information and the target cell information if the neighbor is not set.

In accordance with another aspect of the present invention, at least one non-transitory processor readable medium for storing a computer program of instructions configured to be readable by at least one processor for instructing the at least one processor to execute a computer process is provided. The at least one non-transitory processor readable medium executing the process including: receiving, from a Node B, a message indicating that a radio link is released; storing source cell information; receiving, from UE, an RRC cell update message; storing target cell information included in the RRC cell update message; determining whether a neighbor of a source cell and a target cell is set, based on the source cell information and the target cell information; and setting the neighbor by using the source cell information and the target cell information if the neighbor is not set.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Figure 1:
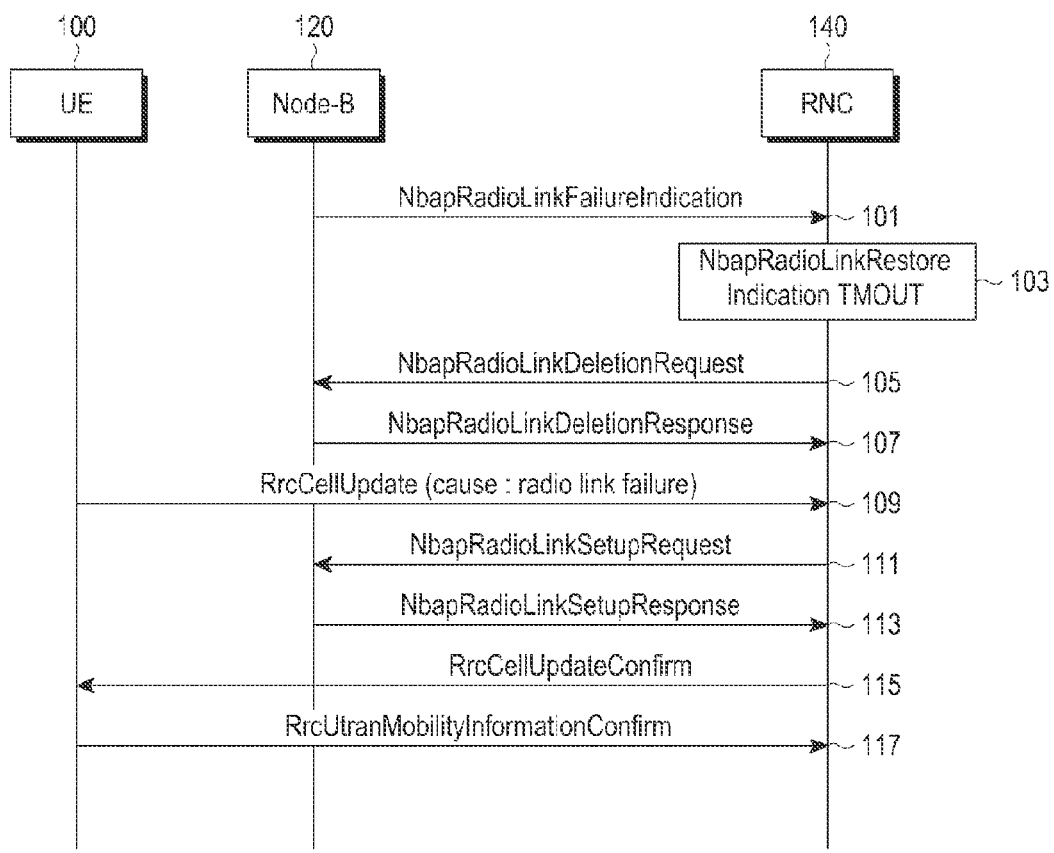
FIG. 1 is a data structure diagram illustrating steps of a general RRE process.

Hereinafter, various embodiments of the present invention will be described in detail below with reference to the accompanying drawings. The same elements will be designated by the same reference numerals although they are shown in different drawings. Further, detailed descriptions related to well-known functions or configurations capable of making subject matters of the present invention unnecessarily obscure will be omitted.

Further, terms or words used in the description and claims below should not be interpreted as only general or dictionary meanings, but interpreted as meanings and concepts satisfying the technical spirit of the present invention based on a principle in that the inventor can appropriately define his/her invention with a concept of the terms in order to describe the invention in the best method.

FIG. 1 is a data structure diagram illustrating steps of a general RRE process in a mobile communication system.

The RRE process performs an RRC connection, which is a wireless connection, and communication when a UE 100 enters a cell in which communication is possible in the state that a previously connected radio link is incomplete enough to fail to transmit and receive data due to a failure of a handover and a shadow area.

It is assumed that a radio link is disconnected in a source cell due to the handover before step 101.

At step 101, a Node B transmits an NbapRadioLinkFailureIndication message notifying a Radio Network Controller (RNC)_140 of a failure (or release) of the radio link due to the handover. At step 103, the RNC 140 determines a performance of an operation of the RRE when an NbapRadioLinkRestoreIndication message notifies restoration of the radio link is a time out TMOUT set by the RNC 140. Then, at step 105, the RNC transmits an NbapRadioLinkDeletionRequest message requesting to delete the radio link to the Node B 120. At step 107, the RNC 140 receives an NbapRadioLinkDeletionResponse message as a response message to the NbapRadioLinkDeletionRequest message requesting to delete the radio link. In turn, at step 109, the RNC 140 receives an RrcCellUpdate message from the UE 100. The RrcCellUpdate message requests an RRC cell update because the radio link is released. At step 111, the RNC 140 receiving the RrcCellUpdate message transmits an NbapRadioLinkSetupRequest message to the Node B 120 to set a connection of RRC. At step 113, the RNC 140 receives an NbapRadioLinkSetupResponse message indicating that the setting of the RRC connection is completed, as a response to the NbapRadioLinkSetupRequest message sent from the Node B 120. When the setting of the RRC connection is completed, the RNC 140 transmits an RrcCellUpdateConfirm message to the UE at step 115. The RrcCellUpdateConfirm message is a response message to the RrcCellUpdate message received in step 109. After step 115, the RNC 140 receives an RrcUtranMobilityInformationConfirm message including information of the UE 100 from the UE 100 at step 117.

In the mobile communication system, coverage of a cell is affected by many factors such as a location of a radio unit, a direction of an antenna, interference with another cell, and the like. Therefore, if a neighbor optimization is performed by reference of only the location information of the Node B, the actual coverage of the cell may not be identical to the neighbor setting. When a UE moves between two adjacent cells in which the neighbor is not set, it is impossible to perform a handover process of maintaining continuity of a call. Thus, a call drop occurs or a cutoff of user traffic occurs due to a performance of RRE, thereby deteriorating a quality of a corresponding system.

In accordance with an embodiment of the present invention, the mobile communication system optimizes the neighbor by using information obtained before and during the performance of the RRE process.

Figure 2:
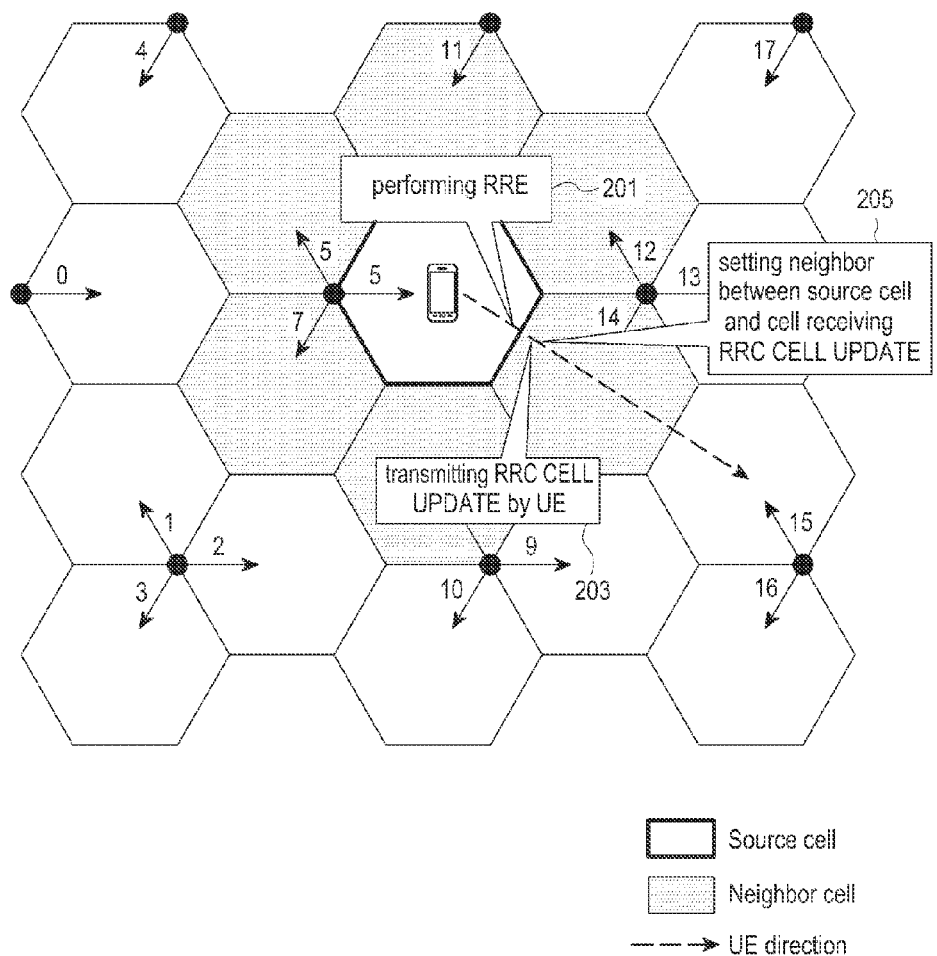
FIG. 2 is a plan view illustrating a configuration of a cell in which an RRE process occurs.

FIG. 2 is a plan view illustrating a configuration of a cell in which an RRE occurs.

Referring to FIG. 2, when a handover of the UE occurs, the RRE starts at step 201. Then, when the UE transmits the RrcCellUpdate message to the RNC at step 203, the RNC sets a neighbor between a source cell and a cell in which the RrcCellUpdate message is received, at step 205. As the Node B transmits information on the cell in which the RrcCellUpdate message is received to the RNC, the RNC may obtain target cell information. In accordance with an embodiment of the present invention, the information obtained during the RRE, i.e., the target cell information obtained through the information on the cell in which the Node B receives the RrcCellUpdate message, may be used for the optimization of the neighbor, resulting in less call drops and a decrease in the cutoff phenomenon of the user traffic caused by the RRE.

Figure 3:
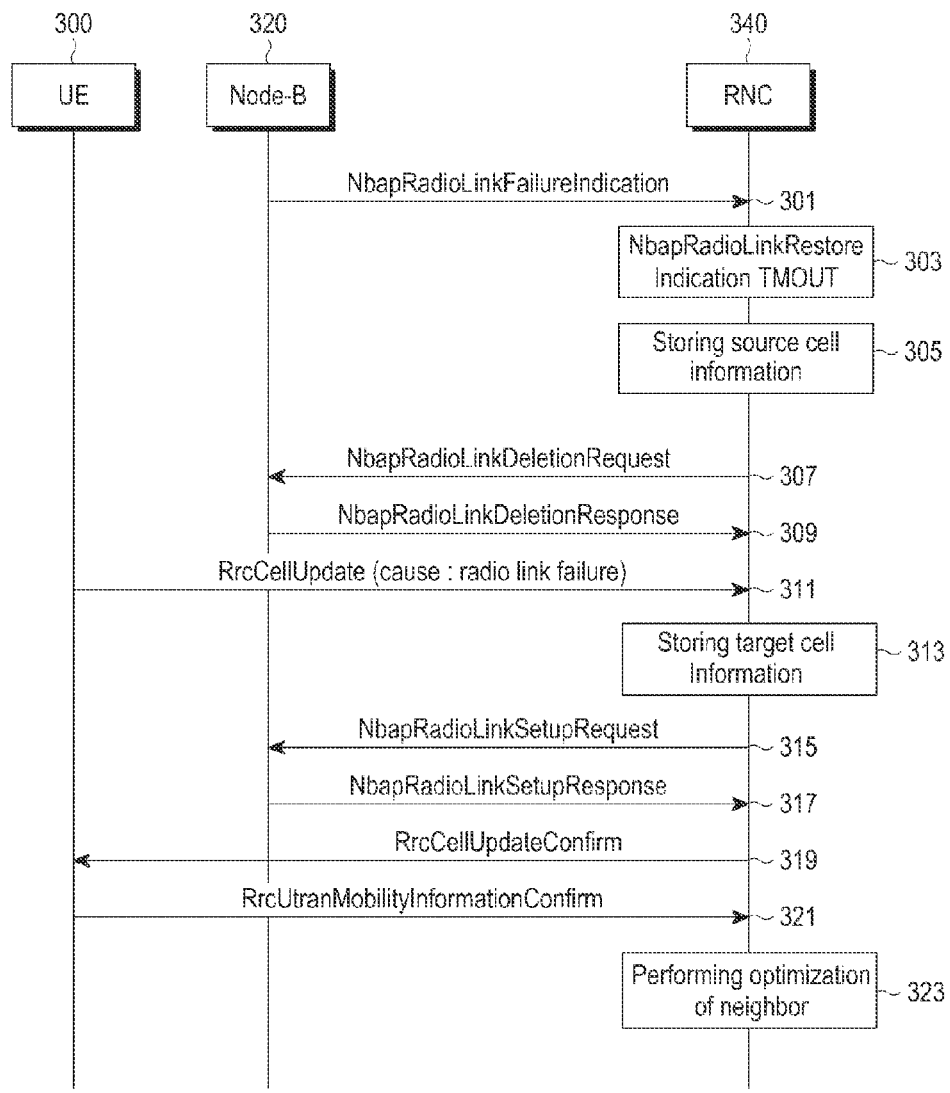
FIG. 3 is a data structure diagram illustrating steps of an RRE process according to an embodiment of the present invention.

FIG. 3 is a data structure diagram illustrating steps of an RRE process according to an embodiment of the present invention.

In FIG. 3, processes, except for processes in steps 305, 313, and 323, are identical to the general processes in FIG. 1.

At step 301, the Node B 320 transmits an NbapRadioLinkFailureIndication message notifying a Radio Network Controller (RNC) 340 of a failure (or release) of a radio link (downlink) due to the handover. At step 303, the RNC 340 determines a performance of an operation of the RRE when an NbapRadioLinkRestoreIndication message for notifying of restoration of the radio link is a time out TMOUT set by the RNC 340. In other words, at step 301, after the NbapRadioLinkFailureIndication message at step 301 is received, a timer of RNC is activated. If the radio link is not restored by the expiration of the timer, this triggers the time out indicating failure of the link restoration.

At step 305, the RNC 340 stores source cell information, and at step 307, the RNC 340 transmits an NbapRadioLinkDeletionRequest message requesting a deletion of the radio link to the Node B 320 to delete all the existing radio links. Then, at step 309, the RNC 340 receives an NbapRadioLinkDeletionResponse message as a response message to the NbapRadioLinkDeletionRequest message requesting the deletion of the radio link. The RNC 340 stores a dominant radio link of currently active radio links as the source cell in a call context by a downlink quality of an RRC measurement report already received at step 305, before transmitting the NbapRadioLinkDeletionRequest message requesting the deletion of the radio link to the Node B 320. That is, the source cell may be determined as the link having a quality superior to the downlink quality of the previously received RRC measurement report among the radio links which are currently active.

After the deletion of the radio links, when the RNC 340 receives an RrcCellUpdate message indicating the failure in receiving the radio link (downlink) from the UE 300 at step 311, the Node B 320 stores information on the cell in which the RrcCellUpdate message is received, as the target cell in the call context, at step 313.

At step 315, the RNC 340 receiving the RrcCellUpdate message transmits an NbapRadioLinkSetupRequest message to the Node B 320 in order to set a connection of the RRC. At step 317, the RNC 340 receives an NbapRadioLinkSetupResponse message of indicating that the setting of the RRC connection is completed, as a response to the NbapRadioLinkSetupRequest message from the Node B 320. When the setting of the RRC connection is completed, the RNC 340 transmits an RrcCellUpdateConfirm message to the UE 300 at step 319. The RrcCellUpdateConfirm message is a response message to the RrcCellUpdate message received at step 311, which includes information for an RRC resetting of the UE 300. After step 319, the RNC 340 receives an RrcUtranMobilityInformationConfirm message including information of the UE 300 from the UE 300 at step 321.

When the RRE is completed, the RNC 340 performs step 323 to determine whether a neighbor of the source cell and the target cell stored at steps 305 and 313 is set. If the neighbor is not set, the neighbor between two cells is set.

The RNC 340 compares the source cell information with the target cell information. If the source cell information and the target cell information are not identical, the neighbor is set based on the target cell information.

Figure 4:
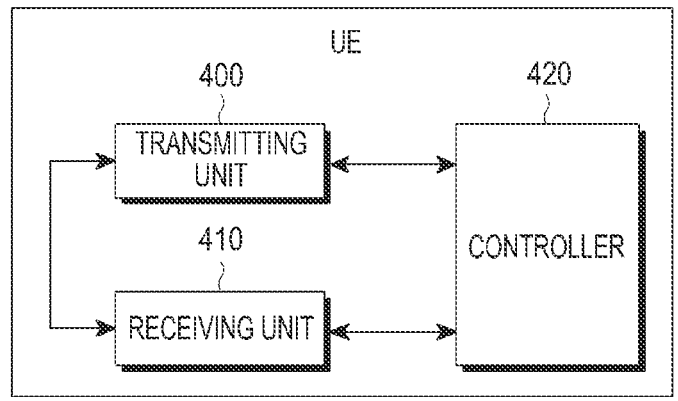
FIG. 4 is a block diagram illustrating a configuration of an UE according to an embodiment of the present invention.

FIG. 4 is a block diagram illustrating a configuration of an UE according to the embodiment of the present invention.

The UE includes a transmission unit 400, a controller 420, a receiving unit 410, and the like.

Figure 5:
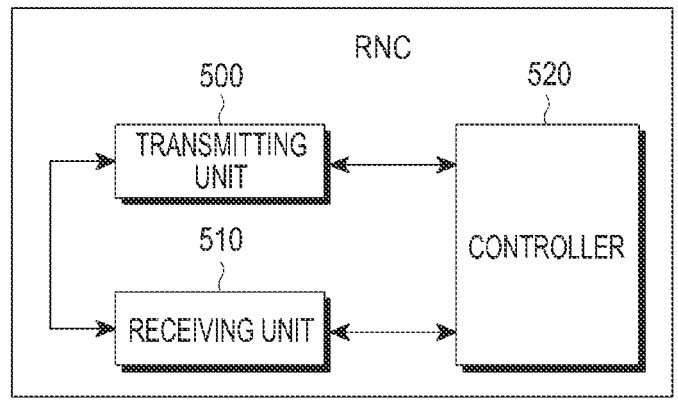
FIG. 5 is a block diagram illustrating a configuration of an RNC according to an embodiment of the present invention.

The transmission unit 400 transmits a message requesting an RRC cell update to the RNC (see FIG. 5). Further, when the RRE process is completed, the transmission unit 400 transmits an RrcUtranMobilityInformationConfirm message including the information of the UE to the RNC.

When a handover occurs in which the UE located in the source cell moves to the target cell, the controller 420 instructs the transmission unit 400 to transmit a message requesting an RRC cell update to the RNC.

When the RRE process is completed, the receiving unit 410 receives the RrcCellUpdateConfirm message from the RNC.

FIG. 5 is a block diagram illustrating a configuration of the RNC according to an embodiment of the present invention.

The RNC includes a transmission unit 500, a controller 520, a receiving unit 510, and the like.

The receiving unit 510 receives an NbapRadioLinkFailureIndication message notifying that a radio link fails (or released) from the Node B, and receives an RrcCellUpdate message from the UE.

The transmission unit 500 transmits an NbapRadioLinkDeletionRequest message requesting a deletion of the radio link in order to delete all the existing radio links.

The controller 520 stores the source cell information and requests the Node B to delete all the existing radio links. When the source cell information is stored, the controller 520 stores a dominant radio link among the radio links which are currently active as the source cell in the call context based on a downlink quality of the previously received RRC measurement report.

When receiving the RrcCellUpdate message from the UE after the deletion of the radio links, the controller 520 stores information on the cell receiving the RrcCellUpdate message as the target cell in the call context.

The controller 520 determines whether the neighbor of the source cell and the target cell which are stored respectively is set. If the neighbor is not set, the controller 520 sets the neighbor between two cells.

Figure 6:
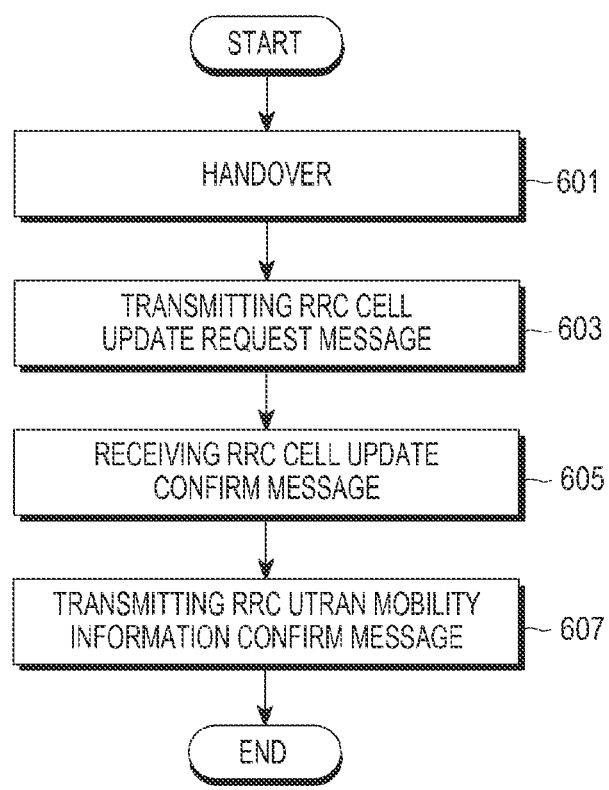
FIG. 6 is a flowchart illustrating an operation of a UE, as illustrated in FIG. 4, according to an embodiment of the present invention.

FIG. 6 is a flowchart illustrating an operation of the UE according to an embodiment of the present invention.

At step 601, a handover occurs in which the UE located in the source cell moves to the target cell.

At step 603, when the deletion of the existing radio link is completed, the UE transmits a message of requesting an RRC cell update to the RNC.

When the RRE process is completed between the RNC and the Node B, the UE receives the RrcCellUpdateConfirm message from the RNC at step 605, and transmits the RrcUtranMobilityInformationConfirm message including the information of the UE to the RNC at step 607.

Figure 7:
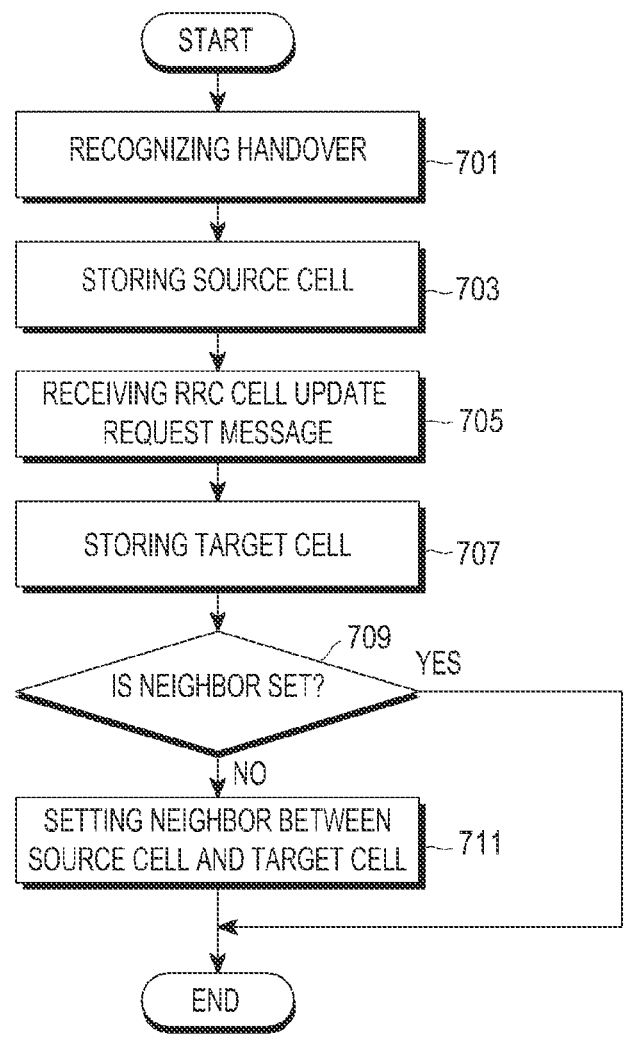
FIG. 7 is a flowchart illustrating an operation of an RNC, as illustrated in FIG. 5, according to an embodiment of the present invention.

FIG. 7 is a flowchart illustrating an operation of the RNC according to an embodiment of the present invention.

At step 701, the RNC receives the NbapRadioLinkFailureIndication message of notifying of the failure (or release) of the radio link from the Node B, and recognizes the occurrence of the handover. Then, at step 703, the RNC stores the source cell information and deletes all the existing radio links.

When the source cell information is stored, the RNC stores a dominant radio link among the radio links which are currently active as the source cell in the call context, based on a downlink quality of the previously received RRC measurement report.

After the deletion of the radio links, when the RNC receives an RrcCellUpdate message from the UE at step 705, the Node B stores information on the cell in which the RrcCellUpdate message is received as the target cell in the call context.

Then, the RNC performs step 709 to determine whether the neighbor of the source cell and the target cell which are stored respectively at steps 703 and 707 is set. If the neighbor is not set between the source cell and the target cell, the RNC performs step 711 to set the neighbor between two cells since it is determined that the two cells are geographically adjacent to each other. If the neighbor is set, however, the RNC is terminated without an additional operation.

The methods according to the aforementioned embodiments of the present invention perform an optimization of the neighbor based on the information of the source cell and the target cell obtained in corresponding processes if the RRE process is carried out in an adjacent cell boundary area in which the neighbor is not set. If the RRE is performed in the adjacent cell boundary area in which the neighbor is not set, a corresponding call has a loss of the user traffic in proportion to a time set by the RNC. This may cause a phenomenon such as silence for several seconds in the voice communication. Accordingly, when the optimization of the neighbor is performed after the RRE is performed, it is unnecessary to perform the RRE process in the same area, thereby preventing the call drop and the loss of the user traffic.

Although the method according to the specific embodiments has been described, the method may be implemented as computer readable codes in a computer readable recording medium. The computer readable recording medium includes all types of recording devices which store data readable by a computer system. An example of the computer readable recording medium includes a ROM, a RAM, a CD-ROM, a magnetic tape, a floppy disk, an optical data storing device, and the like, and also includes an implementation in the form of a carrier wave, e.g., transmission through the Internet. The computer readable recording media may be dispersed to computer systems connected to one another through a network, and store and execute computer readable codes in a dispersion manner. Further, functional programs, codes and code segments for the implementation of the embodiments may be easily inferred by programmers in the art which the present invention pertains to.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for setting a neighbor between two or more cells by a radio network controller (RNC) of a mobile communication system, the method comprising:
    receiving, from a Node B, a message indicating that a radio link is released;
    storing source cell information, when restoration of the radio link fails;
    receiving, from a user equipment (UE), radio resource control (RRC) cell update message;
    storing target cell information included in the RRC cell update message;
    determining whether a neighbor of a source cell and a target cell is set, based on the source cell information and the target cell information; and
    setting the neighbor by using the source cell information and the target cell information if the neighbor is not set.

2. The method as claimed in claim 1, wherein the source cell information and the target cell information are obtained through an RRC reestablishment (RRE) process.

3. The method as claimed in claim 2, wherein the RRE process comprises:
    recognizing a handover;
    storing the source cell information; and
    receiving an update message including the target cell information.

4. The method as claimed in claim 1, wherein the source cell information is determined by a link, which has a value superior to a value of a downlink quality of a previously stored RRC measurement report, among radio links which are currently active.

5. The method as claimed in claim 1, wherein expiration of a timer, which starts when the message indicating that the radio link is released, indicates that the restoration of the radio link has failed.

6. The method as claimed in claim 1, wherein setting the neighbor by using the source cell information and the target cell information comprises:
    comparing the source cell information and the target cell information; and
    if the source cell information and the target cell information are not identical, the neighbor is set based on the target cell information.

7. The method as claimed in claim 1, further comprising:
    transmitting an NbapRadioLinkSetupRequest message to the Node B in order to set a connection of the RRC;
    receiving an NbapRadioLinkSetupResponse message of indicating that the setting of the RRC connection is completed as a response to the NbapRadioLinkSetupRequest message from the Node B;
    transmitting an RrcCellUpdateConfirm message to the UE when the setting of the RRC connection is completed; and
    receiving an RrcUtranMobilitylnformationConfirm message including UE information from the UE.

8. An apparatus for setting a neighbor between two or more cells by a radio network controller (RNC) of a mobile communication system, the apparatus comprising:
    a receiving unit which receives a message indicating that a radio link is released from a Node B and receives radio resource control (RRC) cell update message from a user equipment (UE); and
    a controller, which stores source cell information when restoration of the radio link fails, stores target cell information included in the RRC cell update message, determines whether a neighbor of a source cell and a target cell is set based on the source cell information and the target cell information, and sets the neighbor by using the source cell information and the target cell information if the neighbor is not set.

9. The apparatus as claimed in claim 8, wherein the source cell information and the target cell information are obtained through an RRC reestablishment (RRE) process.

10. The apparatus as claimed in claim 8, wherein the RRE process recognizes a handover, stores the source cell information, and receives an update message including the target cell information.

11. The apparatus as claimed in claim 7, wherein the source cell information is determined by a link, which has a value superior to a value of a downlink quality of a previously stored RRC measurement report, among radio links which are currently active.

12. The apparatus as claimed in claim 8, wherein expiration of a timer, which starts when the message indicating that a radio link is released, indicates that the restoration of the radio link has failed.

13. The apparatus as claimed in claim 8, wherein the controller is configured to compare the source cell information and the target cell information, and if the source cell information and the target cell information are not identical, the neighbor is set based on the target cell information.

14. The apparatus as claimed in claim 8, wherein the controller transmits an NbapRadioLinkSetupRequest message to the Node B in order to set a connection of the RRC, receives an NbapRadioLinkSetipResponse message indicating that the setting of the RRC connection is completed as a response to the NbapRadioLinkSetupRequest message from the Node B, transmits an RrcCellUpdateConfirm message to the UE when the setting of the RRC connection is completed, and receives an RrcUtranMobilityInformationConfirm message including UE information from the UE.

15. A non-transitory computer-readable recording medium for storing a program for implementing a method for setting a neighbor between two or more cells by a radio network controller (RNC) of a mobile communication system comprising:
   receiving, from a Node B, a message indicating that a radio link is released;
   storing source cell information;
   receiving, from a user equipment (UE), radio resource control (RRC) cell update message;
   storing target cell information included in the RRC cell update message;
   determining whether a neighbor of a source cell and a target cell is set, based on the source cell information and the target cell information; and
   setting the neighbor by using the source cell information and the target cell information if the neighbor is not set.

* * * * *